(12) United States Patent　(10) Patent No.: US 12,668,308 B2

Jeon et al.　(45) Date of Patent: Jun. 30, 2026

(54) FRAME ASSEMBLY FOR VEHICLE

(71) Applicants: Hyundai Motor Company, Seoul (KR); Kia Corporation, Seoul (KR)

(72) Inventors: Chang Un Jeon, Hwaseong-si (KR); Jang Won Hong, Hwaseong-si (KR); Seung Tae Song, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 345 days.

(21) Appl. No.: 18/383,568

(22) Filed: Oct. 25, 2023

(65) Prior Publication Data

US 2024/0417001 A1　Dec. 19, 2024

(30) Foreign Application Priority Data

Jun. 14, 2023　(KR) ......................... 10-2023-0076206

(51) Int. Cl.
B62D 25/02　(2006.01)
B62D 25/04　(2006.01)

(52) U.S. Cl.
CPC ........... B62D 25/025 (2013.01); B62D 25/04 (2013.01)

(58) Field of Classification Search
CPC .. B62D 25/025; B62D 25/04; B62D 25/2036; B62D 25/02; B62D 27/023; B62D 27/02; B62D 21/157

USPC ................... 296/209, 29, 30, 187.12, 193.06
See application file for complete search history.

(56) References Cited

U.S. PATENT DOCUMENTS

| 12,060,111 | B2 * | 8/2024 | Kim ..................... B62D 27/023 |
| 2020/0398896 | A1 * | 12/2020 | Grattan .................. B62D 21/15 |
| 2023/0111879 | A1 * | 4/2023 | Oxley .................. B62D 25/025 |
| | | | 296/209 |

FOREIGN PATENT DOCUMENTS

| KR | 10-2020-0068240 A | 6/2020 |
| KR | 10-2024-0047698 A | 4/2024 |

* cited by examiner

*Primary Examiner* — Amy R Weisberg
(74) *Attorney, Agent, or Firm* — Morgan, Lewis & Bockius LLP

(57) ABSTRACT

A frame assembly for a vehicle includes a body side sill provided in an outward direction of a body floor of the vehicle, extending in a longitudinal direction of the vehicle to form an internal space, and including an internal reinforcing portion fixed to the internal space, and a center pillar provided at a side of the vehicle to extend in a vertical direction of the vehicle, disposed outside the body side sill to cover the body side sill from the outside thereof, and coupled to the body side sill to form a load path for side collision of the vehicle.

14 Claims, 6 Drawing Sheets

[FIG. 1]
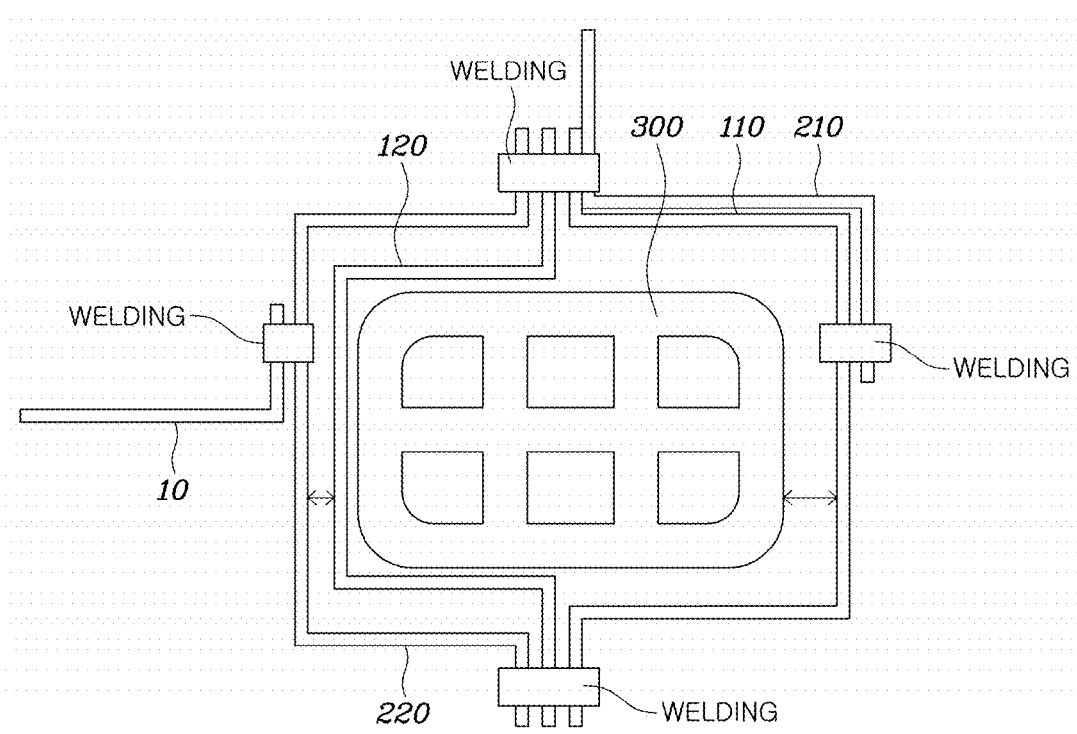

[FIG. 2]
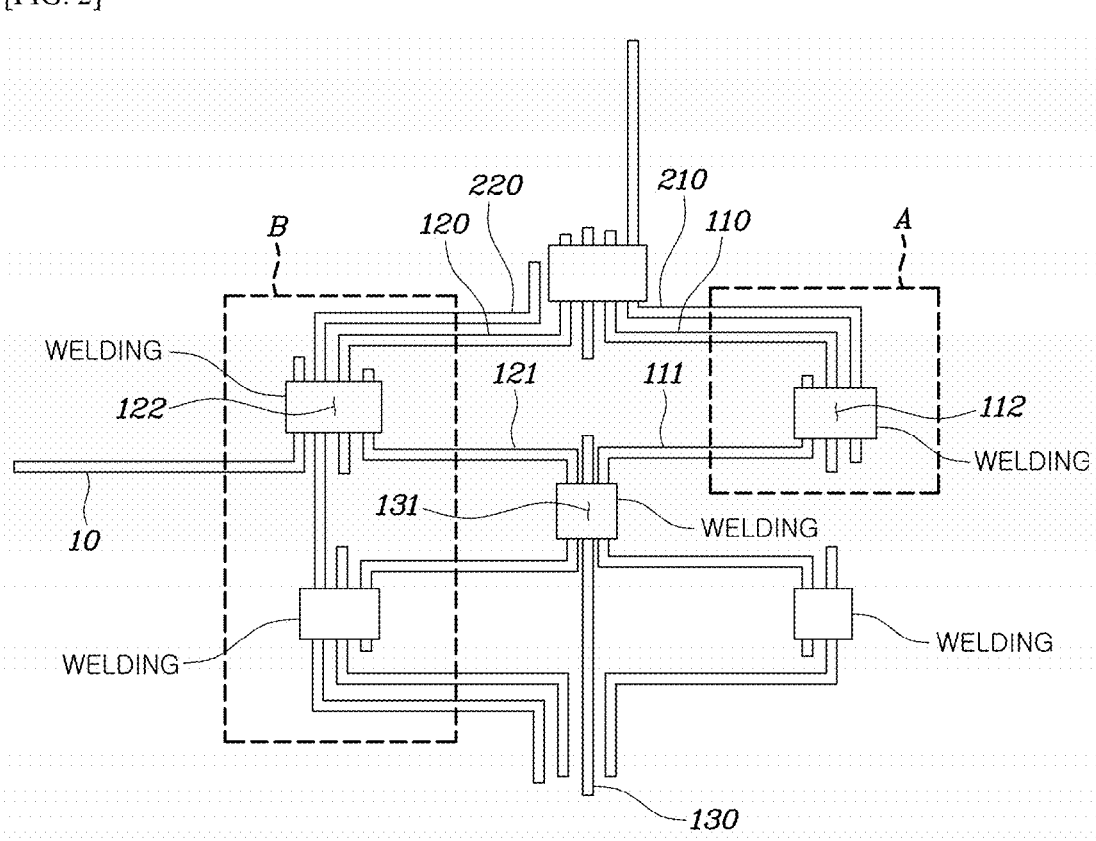

[FIG. 3]
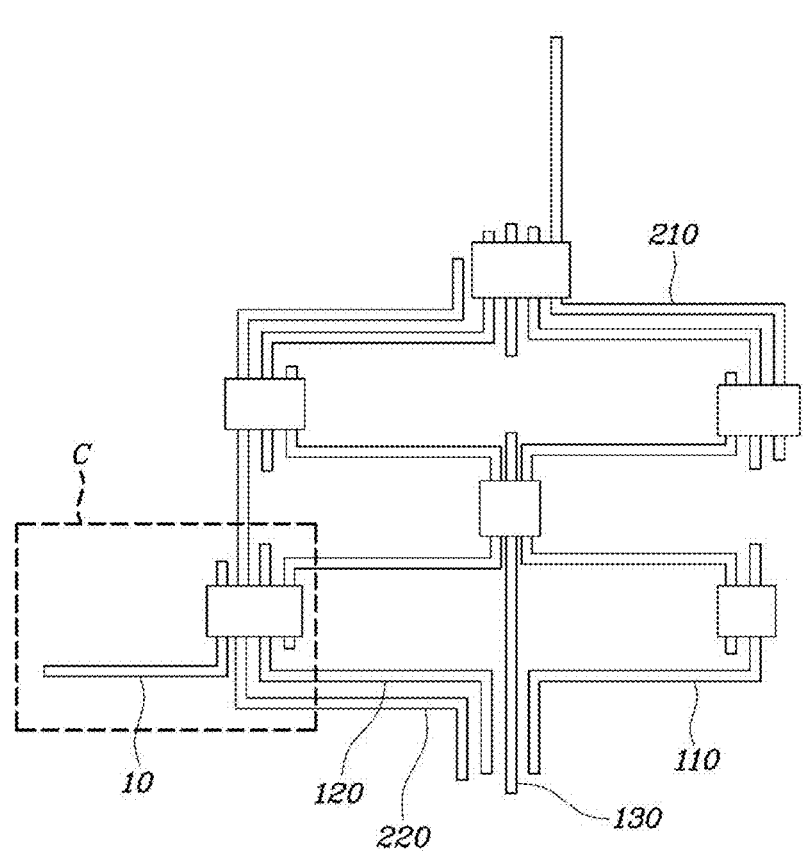

[FIG. 4]
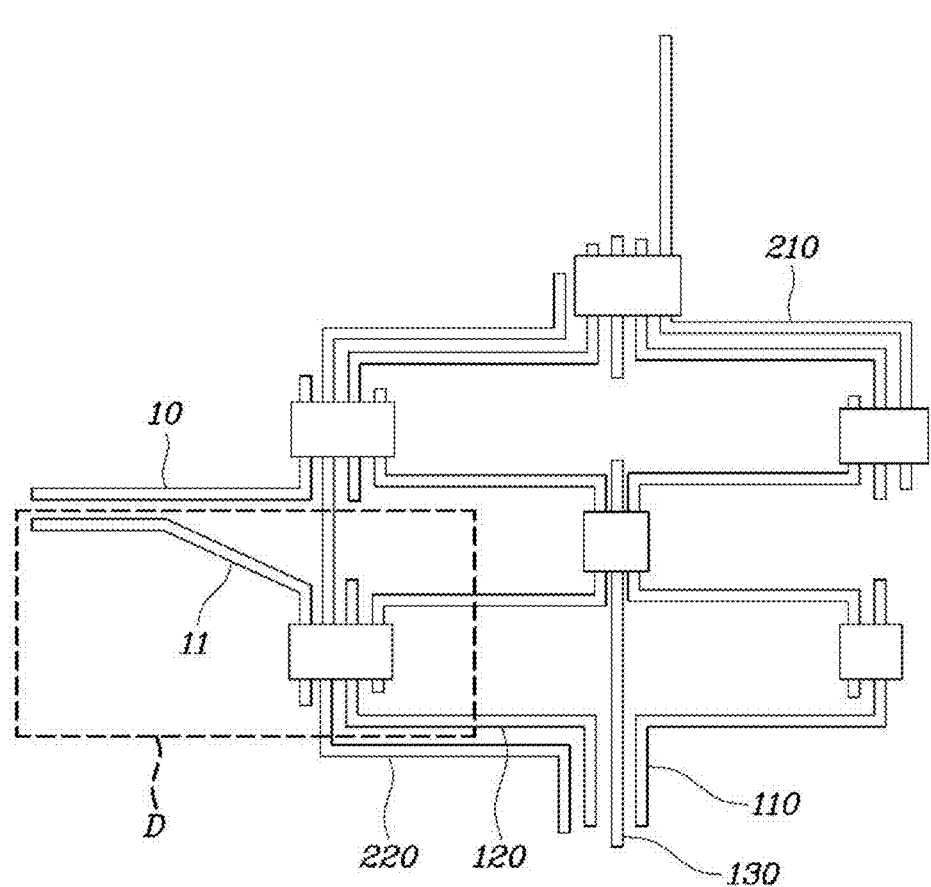

[FIG. 5]
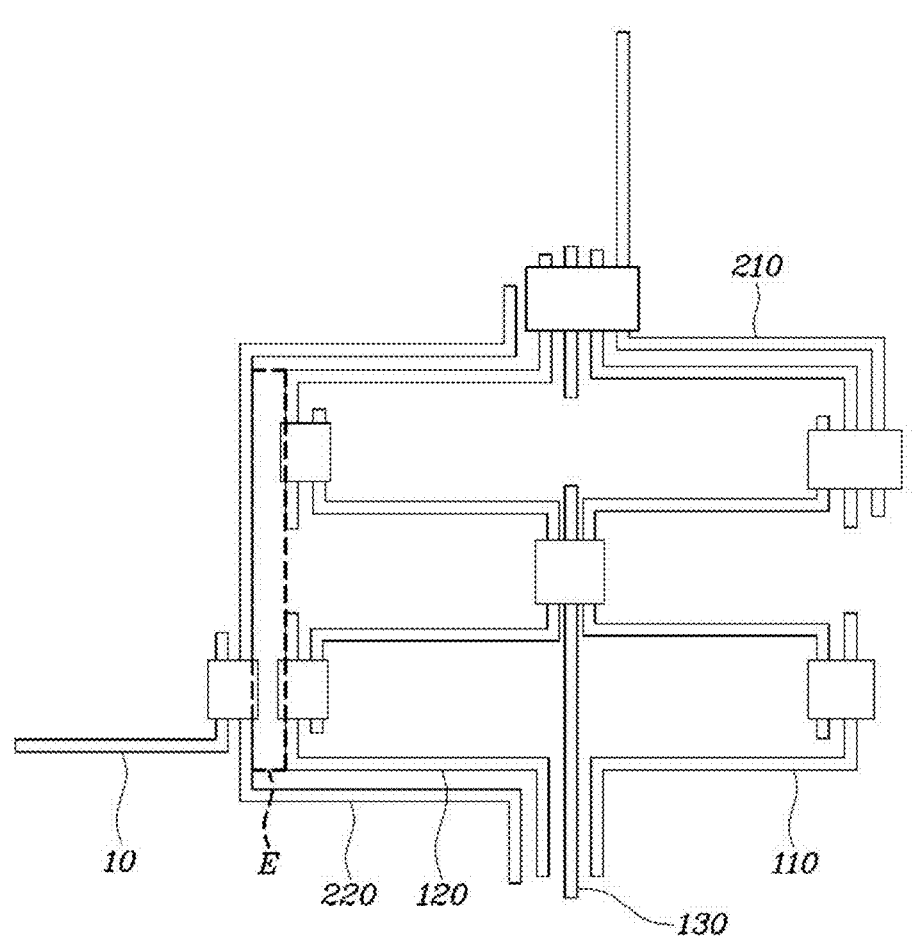

[FIG. 6]
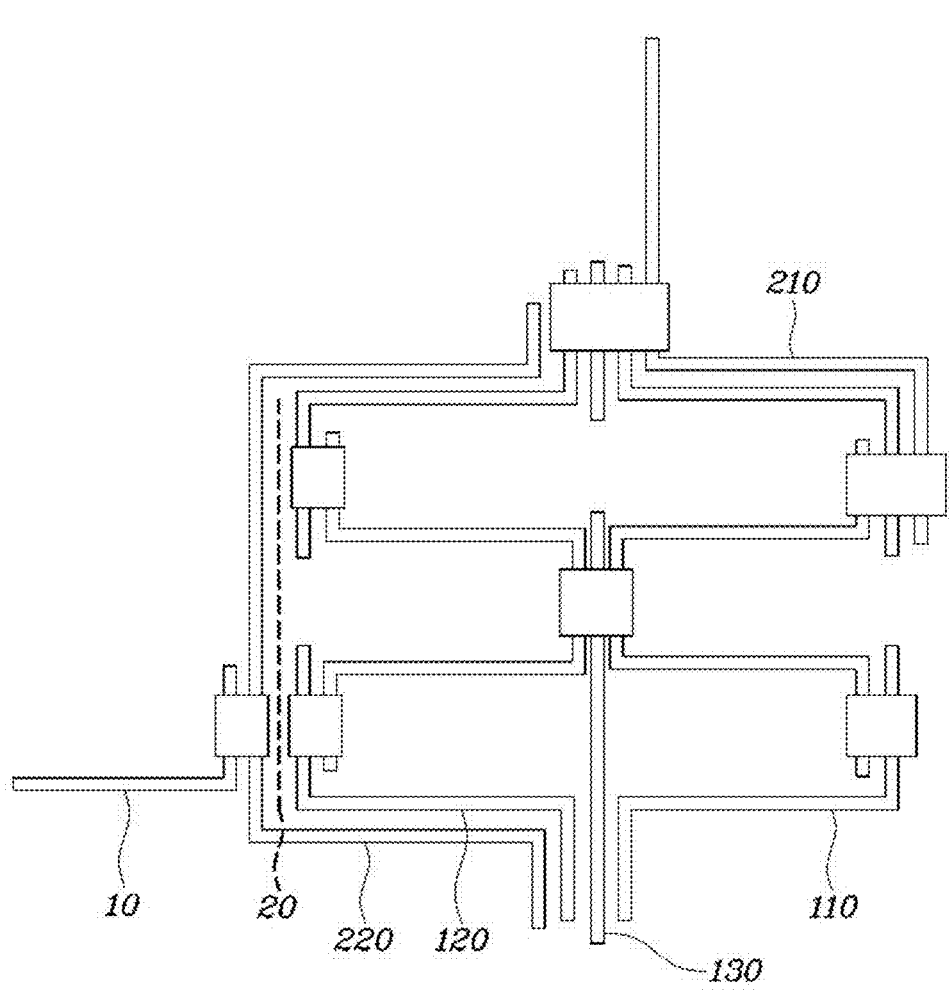

FRAME ASSEMBLY FOR VEHICLE

CROSS REFERENCE TO RELATED APPLICATION

The present application claims priority to Korean Patent Application No. 10-2023-0076206 filed on Jun. 14, 2023, the entire contents of which is incorporated herein for all purposes by this reference.

BACKGROUND OF THE PRESENT DISCLOSURE

Field of the Present Disclosure

The present disclosure relates to a frame assembly for a vehicle, and more specifically, to a frame assembly for a vehicle capable of forming a load path on a side collision of the vehicle through a structure in which a body side sill and a center pillar are coupled.

Description of Related Art

It is preferable that a body side sill, which is one of members forming a side opening of a vehicle, is formed in an appropriate dimension while maintaining a cross-sectional area for securing stiffness and strength. To efficiently use an internal empty space formed in the body side sill, it is preferable that the internal empty space of the body side sill is mostly used to absorb an impact applied from the outside of the vehicle and increase deformation strength.

Problems of the conventional frame assembly for a vehicle will be described with reference to FIG. 1.

FIG. 1 is a view illustrating a conventional frame assembly for a vehicle.

Referring to FIG. 1, a body floor 10 is connected to a side sill internal panel 220, and a center pillar 210 and the side sill internal panel 220 surround body side sills 110 and 120. In the instant case, an extrusion material 300 including aluminum is formed in an internal space formed by the body side sills 110 and 120 to ensure stiffness of each of the body side sills 110 and 120.

Meanwhile, because the extrusion material 300 is not directly connected to the center pillar 210, stiffness of a lower end portion of the center pillar 210, which directly receives a load in the event of side collision of the vehicle, is very weak, and thus the center pillar 210 is torn or is excessively deformed.

Likewise, because the body side sills 110 and 120 are not directly connected to the side sill internal panel 220, a load path for the load transmitted from the center pillar 210 is not formed in the event of side collision of the vehicle. Therefore, there is a problem in that the center pillar 210 is torn or excessively deformed because the load may not be distributed and is concentrated on a specific point.

Therefore, there is a demand for a frame assembly for a vehicle having a structure in which a body side sill and a center pillar are coupled.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a frame assembly for a vehicle for forming a load path that allows a load to be distributed in the event of side collision of the vehicle through a structure in which a body side sill and a center pillar are coupled and a side sill internal panel and the body side sill are coupled.

The objects of the present disclosure are not limited to the above-described object, and other objects that are not mentioned will be able to be clearly understood by those skilled in the art to which the present disclosure pertains from the following description.

As a means for achieving the object, the present disclosure forms a frame assembly for a vehicle including a body side sill provided in an outward direction of a body floor of the vehicle, extending in a longitudinal direction of the vehicle to form an internal space, and including an internal reinforcing portion fixed to the internal space, and a center pillar provided at a side of the vehicle to extend in a vertical direction of the vehicle, disposed outside the body side sill to cover the body side sill from the outside thereof, and coupled to the body side sill to form a load path for side collision of the vehicle.

For example, the body side sill may include a first external panel extending in the longitudinal direction of the vehicle, a second external panel disposed inside the first external panel, and a center panel configured to separate the internal space of the body side sill between the first external panel and the second external panel, and the first external panel and the second external panel may be coupled to form the internal space.

For example, the internal reinforcing portion may include a first internal panel extending in the longitudinal direction of the vehicle and a second internal panel disposed inside the first internal panel in the internal space of the body side sill, and each of the first internal panel and the second internal panel may be fixed to one of internal surfaces of the first external panel and the second external panel.

For example, the center pillar may be coupled to the first external panel.

For example, each of the first internal panel and the second internal panel may be disposed so that center portions of the first internal panel and the second internal panel are bent and the respective center portions face each other and are in contact with each other in the internal space of the body side sill.

For example, a first through hole configured to allow the first internal panel and the center pillar to be bonded by inserting a bonding mechanism into the first through hole may be formed in the first external panel, and a plurality of first through holes may be spaced from each other in the longitudinal direction of the vehicle.

For example, the body side sill and the internal reinforcing portion may be made of a steel material.

For example, the frame assembly may further include a side sill internal panel provided in an outward direction of the body floor to be connected to the body floor in a width direction of the vehicle, and configured to cover the second external panel of the body side sill.

For example, the side sill internal panel may be coupled to the body side sill in the width direction of the vehicle so that the center pillar, the body side sill, and the side sill internal panel form the load path for side collision of the vehicle.

For example, the side sill internal panel may be coupled to the body side sill in a state in which the body side sill and the center pillar are coupled.

For example, the side sill internal panel may cover the body side sill at a distance in a lateral direction of the body side sill.

For example, the frame assembly may further include a reinforcing panel connecting the body floor and the side sill internal panel, wherein one end portion of the reinforcing panel may support a lower surface of the body floor, and the other end portion thereof may support an internal surface of the side sill internal panel.

For example, the body side sill and the internal reinforcing portion, the center pillar and the body side sill, and the body side sill and the side sill internal panel may be weld-coupled.

For example, a second through hole may be formed in the second external panel, a third through hole may be formed in the center panel, and the second through hole and the third through hole may be formed at corresponding positions laterally so that a bonding mechanism is inserted into the second through hole and the third through hole to bond the second external panel and the side sill internal panel.

According to the frame assembly for a vehicle of the present disclosure, it is possible to form the load path that allows the load to be distributed in the event of side collision of the vehicle through the structure in which the body side sill and the center pillar are coupled and the side sill internal panel and the body side sill are coupled.

The effects obtainable from the present disclosure are not limited to the above-described effects, and other effects that are not mentioned will be able to be clearly understood by those skilled in the art to which the present disclosure pertains from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a view exemplarily illustrating a conventional frame assembly for a vehicle;

FIG. 2 is a view exemplarily illustrating a configuration of a frame assembly for a vehicle according to an exemplary embodiment of the present disclosure;

FIG. 3 is a view exemplarily illustrating that a body floor is connected to a lower end portion of a side sill internal panel according to an exemplary embodiment of the present disclosure;

FIG. 4 is a view exemplarily illustrating a reinforcing panel connecting the body floor to the side sill internal panel according to an exemplary embodiment of the present disclosure;

FIG. 5 is a view exemplarily illustrating a gap formed between the side sill internal panel and a body side sill according to an exemplary embodiment of the present disclosure; and FIG. 6 is a view exemplarily illustrating that an adhesive is applied between the side sill internal panel and the body side sill according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, and the same or similar components are denoted by the same reference numerals regardless of the drawing symbols, and overlapping descriptions thereof will be omitted.

The suffixes "module" and "unit" for components used in the following description are provided or used interchangeably in consideration of ease of writing the specification and do not have meanings or roles that are distinct from each other by themselves.

In describing the exemplary embodiments included in the present specification, when it is determined that a detailed description of a related known technology may obscure the gist of the exemplary embodiments included in the present specification, a detailed description thereof will be omitted. Furthermore, the accompanying drawings are only for easy understanding of the exemplary embodiments included in the present specification, and it should be understood that the technical spirit included in the present specification is not limited by the accompanying drawings, and all changes, equivalents, or substitutes included in the spirit and technical scope of the present disclosure are included in the accompanying drawings. Terms including ordinal numbers such as second or first may be used to describe various components, but the components are not limited by the terms. The terms are used only for distinguishing one component from another.

When a certain component is described as being "connected" or "coupled" to another component, it is understood that it may be directly connected or coupled to another component or other components may also be disposed therebetween. On the other hand, when a certain component is described as being "directly connected" or "directly coupled" to another component, it should be understood that other components are not present therebetween.

The singular expression includes the plural expression unless the context clearly dictates otherwise.

In the specification, it should be understood that terms such as "comprise" or "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

An exemplary embodiment of the present disclosure proposes integrated management of power of a main battery and power of a swappable battery by additionally connecting the swappable battery together with the main battery electrically connected to a driving motor in an electrified vehicle.

FIG. 2 is a view exemplarily illustrating a configuration of a frame assembly for a vehicle according to an exemplary embodiment of the present disclosure. FIG. 2 mainly illustrates components related to the exemplary embodiment and of course, may include fewer or more components in implementing an actual frame assembly for a vehicle.

Referring to FIG. 2, the frame assembly for a vehicle according to various exemplary embodiments of the present disclosure may include a body side sill, a center pillar 210, and a side sill internal panel 220.

The body side sill is provided in an outward direction of the body floor 10 of the vehicle, extends in a longitudinal direction of the vehicle to form an internal space, and includes an internal reinforcing portion fixed to the internal space.

The body side sill may be formed of a plurality of panels and may include a first external panel 110, a second external panel 120, and a center panel 130. The first external panel 110 extends in the longitudinal direction of the vehicle, and the second external panel 120 is disposed inside the first external panel 110. Furthermore, the center panel 130 separates the internal space of the body side sill between the first external panel 110 and the second external panel 120. The internal space of the body side sill may be formed by coupling the first external panel 110 to the second external panel 120.

Furthermore, the internal reinforcing portion is provided in the internal space of the body side sill to increase stiffness of the body side sill. The internal reinforcing portion may be formed of a plurality of panels and may include a first internal panel 111 and a second internal panel 121. The first internal panel 111 extends in the longitudinal direction of the vehicle in the internal space of the body side sill, and the second internal panel 121 is disposed inside the first internal panel 111. Each of the first internal panel 111 and the second internal panel 121 may be fixed to one of internal surfaces of the first external panel 110 and the second external panel 120, increasing the stiffness of the body side sill.

In the instant case, each of the first internal panel 111 and the second internal panel 121 may be formed in a shape in which a center portion is bent. Through the present shape, the first internal panel 111 and the second internal panel 121 may be weld-coupled in a state in which the respective center portions face each other and are in contact with each other in the internal space of the body side sill. Therefore, it is possible to increase the stiffness of the body side sill and further increase the stiffness of the body side sill by forming the body side sill and the internal reinforcing portion made of a steel material.

Furthermore, referring to region A in FIG. 2, a first through hole 112 is formed in the first external panel 110. A plurality of first through holes 112 may be spaced from each other in the longitudinal direction of the vehicle, and a bond mechanism may be inserted into the first through holes 112 so that the first internal panel 111 and the center pillar 210 may be easily bonded.

Next, the center pillar 210 is provided at a side of a body and extends in a vertical direction of the vehicle. The center pillar 210 may be disposed outside the body side sill to cover the body side sill from the outside thereof and coupled to the body side sill to form a load path for side collision of the vehicle. In the instant case, the center pillar 210 may be coupled to the first external panel 110 to strengthen assembly convenience and connectivity of the frame assembly for a vehicle.

Furthermore, a second through hole 122 may be formed in the second external panel 120, and a third through hole 131 may be formed in the center panel 130. In the instant case, the second through hole 122 and the third through hole 131 may be formed at corresponding positions laterally so that a bonding mechanism is inserted into the second through hole 122 and the third through hole 131 to bond the second external panel 120 and the side sill internal panel 220.

Through the present structure, the bonding mechanism may be inserted horizontally from the outside of the vehicle so that a robot or a worker may easily work.

Furthermore, referring to region B in FIG. 2, the side sill internal panel 220 is provided outside the body floor 10 and connected to the body floor 10 in a width direction of the vehicle. Furthermore, the side sill internal panel 220 may cover the second external panel 120 of the body side sill, have one side coupled to the body side sill in the width direction of the vehicle to connect the center pillar 210, the body side sill, and the side sill internal panel 220, and form a load path for side collision of the vehicle.

In the instant case, the side sill internal panel 220 may be coupled to the body side sill in a state in which the body side sill and the center pillar 210 are coupled to strengthen the assembly convenience and connectivity of the frame assembly for a vehicle.

The body side sill and the internal reinforcing portion, the center pillar 210 and the body side sill, and the body side sill and the side sill internal panel 220 described above may be configured to be welded, further increasing the stiffness against the side collision of the vehicle.

Hereinafter, various embodiments of the frame assembly for a vehicle will be described.

First, a structure in which the body floor 10 is connected to the lower end portion of the side sill internal panel 220 is provided. FIG. 3 is a view exemplarily illustrating that the body floor 10 is connected to the lower end portion of the side sill internal panel 220 according to an exemplary embodiment of the present disclosure. Referring to region C in FIG. 3, by connecting the body floor 10 to the lower end portion of the side sill internal panel 220, it is possible to secure the stiffness against side collision of the vehicle in the same manner as the above-described structure while extending the internal space of the vehicle.

Second, a structure in which a reinforcing panel connecting the body floor 10 to the side sill internal panel 220 is formed is provided. FIG. 4 is a view exemplarily illustrating the reinforcing panel 11 connecting the body floor 10 to the side sill internal panel 220 according to an exemplary embodiment of the present disclosure. Referring to region D in FIG. 4, one end portion of the reinforcing panel 11 may support a lower surface of the body floor 10, and the other end portion thereof may support an internal surface of the side sill internal panel 220. Through a structure such as the reinforcing panel 11, it is possible to further increase stiffness against the side collision of the vehicle.

Third, a structure in which a gap E is formed between the side sill internal panel 220 and the body side sill is provided. FIG. 5 is a view exemplarily illustrating the gap E formed between the side sill internal panel 220 and the body side sill according to an exemplary embodiment of the present disclosure. Referring to FIG. 5, the side sill internal panel 220 may cover the body side sill at a distance in a lateral direction of the body side sill. Through the present structure, it is possible to sufficiently secure a space in which the second external panel 120 is deformed in the event of side collision of the vehicle, increasing the stiffness of the entire frame assembly.

Fourth, a structure in which an adhesive 20 is applied between the side sill internal panel 220 and the body side sill is provided. FIG. 6 is a view exemplarily illustrating that the adhesive 20 is applied between the side sill internal panel 220 and the body side sill according to an exemplary embodiment of the present disclosure. As illustrated in FIG. 6, by applying the adhesive 20 or attaching a foam tape between the side sill internal panel 220 and the body side sill, it is possible to secure stiffness against the side collision of the vehicle and prevent the occurrence of a bonding gap.

According to the above-described embodiments of the present disclosure, it is possible to form the load path that allows the load to be distributed in the event of side collision of the vehicle through the structure in which the body side sill and the center pillar are coupled and the side sill internal panel and the body side sill are coupled.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A frame assembly for a vehicle, the frame assembly comprising:

a body side sill provided in an outward direction of a body floor of the vehicle, extending in a longitudinal direction of the vehicle to form an internal space, and including an internal reinforcing portion fixed to the internal space;

a center pillar provided at a side of the vehicle to extend in a vertical direction of the vehicle, disposed outside the body side sill to cover the body side sill from the outside thereof, and coupled to the body side sill to form a load path for side collision of the vehicle, wherein the body side sill includes:

a first external panel extending in the longitudinal direction of the vehicle;

a second external panel disposed inside the first external panel; and a center panel configured to separate the internal space of the body side sill between the first external panel and the second external panel, wherein the first external panel and the second external panel are coupled to form the internal space; and a side sill internal panel provided in an outward direction of the body floor to be connected to the body floor in a width direction of the vehicle, and configured to cover the second external panel of the body side sill, wherein the side sill internal panel covers the body side sill at a distance in a lateral direction of the body side sill.

2. The frame assembly of claim 1, wherein the internal reinforcing portion includes:

a first internal panel extending in the longitudinal direction of the vehicle; and a second internal panel disposed inside the first internal panel in the internal space of the body side sill, wherein each of the first internal panel and the second internal panel is fixed to one of internal surfaces of the first external panel and the second external panel.

3. The frame assembly of claim 1, wherein the center pillar is coupled to the first external panel.

4. The frame assembly of claim 2, wherein each of the first internal panel and the second internal panel is disposed so that center portions of the first internal panel and the second internal panel are bent and the respective center portions face each other and are in contact with each other in the internal space of the body side sill.

5. The frame assembly of claim 2, wherein respective center portions of the first internal panel and the second internal panel are connected to the center panel.

6. The frame assembly of claim 2, wherein a first through hole configured to allow the first internal panel and the center pillar to be bonded by inserting a bonding mechanism into the first through hole is formed in the first external panel.

7. The frame assembly of claim 6, wherein a plurality of first through holes are spaced from each other in the longitudinal direction of the vehicle.

8. The frame assembly of claim 1, wherein the body side sill and the internal reinforcing portion are made of a steel material.

9. The frame assembly of claim 1, wherein the side sill internal panel is coupled to the body side sill in the width direction of the vehicle so that the center pillar, the body side sill, and the side sill internal panel form the load path for the side collision of the vehicle.

10. The frame assembly of claim 9, wherein the side sill internal panel is coupled to the body side sill in a state in which the body side sill and the center pillar are coupled.

11. The frame assembly of claim 1, further including a reinforcing panel connecting the body floor and the side sill internal panel, wherein a first end portion of the reinforcing panel supports a lower surface of the body floor, and a second end portion thereof supports an internal surface of the side sill internal panel.

12. The frame assembly of claim 1, wherein the body side sill and the internal reinforcing portion, the center pillar and the body side sill, and the side sill internal panel are weld-coupled.

13. The frame assembly of claim 6, wherein a second through hole is formed in the second external panel, a third through hole is formed in the center panel, and the second through hole and the third through hole are formed at corresponding positions laterally so that a bonding mechanism is inserted into the second through hole and the third through hole to bond the second external panel and the side sill internal panel.

14. The frame assembly of claim 1, wherein an adhesive is applied between the side sill internal panel and the body side sill to attach the side sill internal panel and the body side sill.

* * * * *